(12) United States Patent
Schwartz et al.

(10) Patent No.: US 7,406,983 B2
(45) Date of Patent: Aug. 5, 2008

(54) SHUT-OFF FITTING

(75) Inventors: Simon Schwartz, Dahn (DE);
Alexander Rothermel, Schriessheim (DE); Fabian Maier, Westheim (DE); Dirk Elsasser, Mannheim (DE); Heiko Gehr, Landau/Pfalz (DE); Wolfgang Sichler, Mannheim (DE); Harald Schmitt, Mannheim (DE); Michael Schneider, Mannheim (DE); Ralf Schmich, Heidelberg (DE)

(73) Assignee: Friatec Aktiengesellschaft, Mannheim (DE)

( * ) Notice: Subject to any disclaimer, the term of this patent is extended or adjusted under 35 U.S.C. 154(b) by 415 days.

(21) Appl. No.: 10/515,278

(22) PCT Filed: May 23, 2003

(86) PCT No.: PCT/DE03/01671

§ 371 (c)(1),
(2), (4) Date: Jul. 18, 2005

(87) PCT Pub. No.: WO03/100302

PCT Pub. Date: Dec. 4, 2003

(65) Prior Publication Data

US 2006/0081296 A1 Apr. 20, 2006

(30) Foreign Application Priority Data

May 23, 2002 (DE) ................................ 102 22 963

(51) Int. Cl.
*F16K 51/00* (2006.01)
(52) U.S. Cl. .................. 137/614.11; 251/175; 251/228; 251/279; 251/298
(58) Field of Classification Search ............... 251/279, 251/228, 229, 169, 294, 175, 298; 137/614.11
See application file for complete search history.

(56) References Cited

U.S. PATENT DOCUMENTS 114,338 A * 5/1871 Pierce ..................... 251/169

(Continued)

FOREIGN PATENT DOCUMENTS

DE 1 042 323 10/1958

(Continued)

OTHER PUBLICATIONS

International Preliminary Examination Report for PCT/DE2003/001671.

(Continued)

*Primary Examiner*—John Bastianelli
(74) *Attorney, Agent, or Firm*—Aslan Baghdadi; Paul, Hastings, Janofsky & Walker LLP

(57) ABSTRACT

The invention relates to a shut-off fitting comprising a housing which is connected to an adjacent pipeline in a pressure tight manner, the diameter of said pipeline defining a tubular passage in the housing. Said fitting also comprises at least one closing body which can be displaced between an open position and a closed position. The inventive shut-off fitting is characterized in that the at least one closing body can be displaced by an articulated mechanism, by means of an actuator which can be vertically displaced in relation to the flow direction, in such a way that it is arranged outside the tubular passage in its open position. The closing body has a contour which is adapted to the contour of the tubular passage, in the open position, and is located on the tubular passage in a radially sealing manner.

3 Claims, 17 Drawing Sheets

U.S. PATENT DOCUMENTS

| | | | | |
|---|---|---|---|---|
| 1,368,970 A | * | 2/1921 | Roberts et al. | 251/294 |
| 1,782,238 A | * | 11/1930 | Kirchhan | 251/228 |
| 1,818,050 A | * | 8/1931 | Dow | 251/306 |
| 2,389,947 A | * | 11/1945 | Allen | 251/228 |
| 2,535,525 A | * | 12/1950 | Wolfe | 251/228 |
| 2,831,498 A | * | 4/1958 | Thomsen | 137/614.14 |
| 3,119,594 A | * | 1/1964 | Heggem | 251/228 |
| 3,254,660 A | * | 6/1966 | Ray | 251/228 |
| 3,510,101 A | * | 5/1970 | Burtis | 251/228 |
| 3,632,080 A | * | 1/1972 | King | 251/228 |
| 3,771,759 A | * | 11/1973 | Pauquette | 251/305 |
| 3,904,172 A | * | 9/1975 | Baumann | 251/294 |
| 4,558,718 A | | 12/1985 | Garfield | |
| 4,706,706 A | * | 11/1987 | Page et al. | 251/284 |
| 4,832,078 A | * | 5/1989 | Szekely et al. | 251/228 |
| 4,944,490 A | * | 7/1990 | Kennedy | 251/306 |
| 5,244,011 A | * | 9/1993 | Feldinger | 137/614.13 |
| 5,501,427 A | * | 3/1996 | Ando | 251/298 |

FOREIGN PATENT DOCUMENTS

| | | |
|---|---|---|
| DE | 295 19 740 U1 | 2/1996 |
| EP | 0 493 029 A1 | 7/1992 |
| FR | 608182 | 7/1926 |
| FR | 910335 | 6/1946 |
| FR | 1147893 | 12/1957 |

OTHER PUBLICATIONS

European Search Report for PCT/DE 03/001671.

* cited by examiner

SHUT-OFF FITTING

BACKGROUND

This application is a national stage application of international application PCT/DE03/01671, filed May 23, 2002, which is incorporated by reference in its entirety herein.

1. Field of the Invention

The present invention relates to a shut-off fitting that includes a housing that is connected to an adjacent pipeline and at least one closing body for the pipeline which can be displaced between an open position and a closed position.

2. Background of the Invention

Preferably, such shut-off fittings should require little maintenance and should resist corrosion. They could be made of metal or plastic whereby fittings made of thermoplastic materials have the advantage that the housing parts can be joined using not only commonly used welding methods but also mirror heating element joint methods or heater coil welding techniques. The joint could also result using attachment to an already existing PE pipe network.

Metallic shut-off fittings in the prior art often experience corrosion and severe incrusting when used in drinking water networks. This corrosion or incrusting could lead to operating trouble, such as leakage and damage to the shut-off fitting. In particular, metallic shut-off fittings often suffer sever corrosion due to the heavy weight and mechanical attachment, usually by means of a flanged port fitted with screws, especially when used underground.

Tight closing shut-off fittings used in many different processes even under high pressure and high temperature can be well preserved. Most devices utilize closing bodies which move about an axis laterally to the flow and flows around in the open position.

DE 10 13 135 relates to a high pressure non-return valve made of forging steel which in a fitting inside the pipe can be swiveled about an axis fitted on the outside of the tubular passage in such a way that the tubular passage is opened. While closed, the valve or the closing body lies axially on a circular carrying surface fitted in the tubular passage.

GB 2 009 877 relates to a pipe fitted with two set apart closing valves which basically form a further developed non-return valve. One of the valves is kept in the closed position by a stopping mechanism.

U.S. Pat. No. 4,064,916 relates to a deformable blocking blister which can be moved through the tubular passage by means of cable feeding.

Some uses, in particular when relatively small pipe diameters are utilized, such as in the drinking water area, a shut-off body, will interfere with the flow. It is not possible to lead a go-devil through the pipe either, not even in the open position.

It is thus the object of the invention to provide a shut-off fitting made of thermoplastic material that can be reinforced if necessary so that the disadvantages of the well-known metallic gate valves are avoided.

BRIEF SUMMARY OF THE INVENTION

In accordance with the invention, this is achieved by allowing at least one closing body to be displaced by an articulated mechanism by means of an actuator which can be vertically displaced in relation to the flow direction in such a way that, in its open position, it is arranged outside the tubular passage whereby the closing body has a contour which, in the open position, is adapted to the contour of the tubular passage and in the close position is located on the tubular passage in a radially sealing manner. The actuator can, for example, be a screw drive, in particular, a non-raising screw drive.

Preferably, the closing body is displaceable around an axis that is mounted to the housing and which lies lateral to the flow on the height of the pipe diameter or further on in radial direction towards the outside.

The articulated mechanism may be fitted with an axis mounted to the housing and an axis mounted to the actuator whereby the distance between the axis mounted to the housing and the axis mounted to the actuator preferably is chosen so that the when the highest end position of the vertically displaceable actuator is reached, the closing body is moved so it basically is aligned with the pipe line.

Another embodiment of the invention shows the closing body fitted with a guide slot into which grabs an actuator mounted hitch that is movable along the guide slot by means of the actuator.

The closing body may be moved around an axis which is located inside the tubular passage. The axis may be mounted to the housing inside the tubular passage or be movable inside the tubular passage along a guide slot in the housing. In the case of the first alternative embodiment it is preferable that the axis that is mounted to the housing is integrated into the closing bodies. To move the closing body between the open and closed position it could be moved using a lever hinged onto the actuator. Another modification allows the closing body to be moved using a flexible cable feeder attached to the actuator.

Finally, in another preferred embodiment the closing body is only attached to the actuator. The closing body is thus lying inside the pipe and is guided to its correct position through form fitting using hydraulic force. The closing body is in self-stabilizing and is more flexible with respect to the sealing edge.

Particularly preferred are two closing bodies that lie across from each other in the flow direction. The invention allows for the generation of a smooth cleanable pipe floor. The articulated mechanism uses pressure during the closing and opening processes. The closing bodies that lie across from each other limit the amount of, dead water space available which eliminates germination when the flow is stagnate.

Short draining operation periods benefit the flow of force and stress for the housing design. Generally, the number of rotary joints or axes of rotation should be kept to a minimum to keep costs down and to limit the chance of interference.

Additional embodiments of the closing body or bodies are possible. For example, one closing body could be shaped like vertical or horizontal shutters fitted with several slats which fold on top of each other and sink into the housing in the open position. The closing body can also be shaped like an iris diaphragm whereby, in the open position, the plates are radially pulled outwards and sink into the housing. A closing body shaped like a diaphragm can also be pulled out of the pipe diameter by means of a corresponding guide channel whereby the guide channel ensures leak-tightness. Furthermore, the closing body can be a threaded bolt which in the closed position covers the pipe diameter and to achieve the open position is led out of the pipe diameter by means of threading driving mechanism.

The structures of the actuator and articulation mechanisms are adapted to fit each embodiment of the closing body.

DETAILED DESCRIPTION OF THE INVENTION

Figure 1:
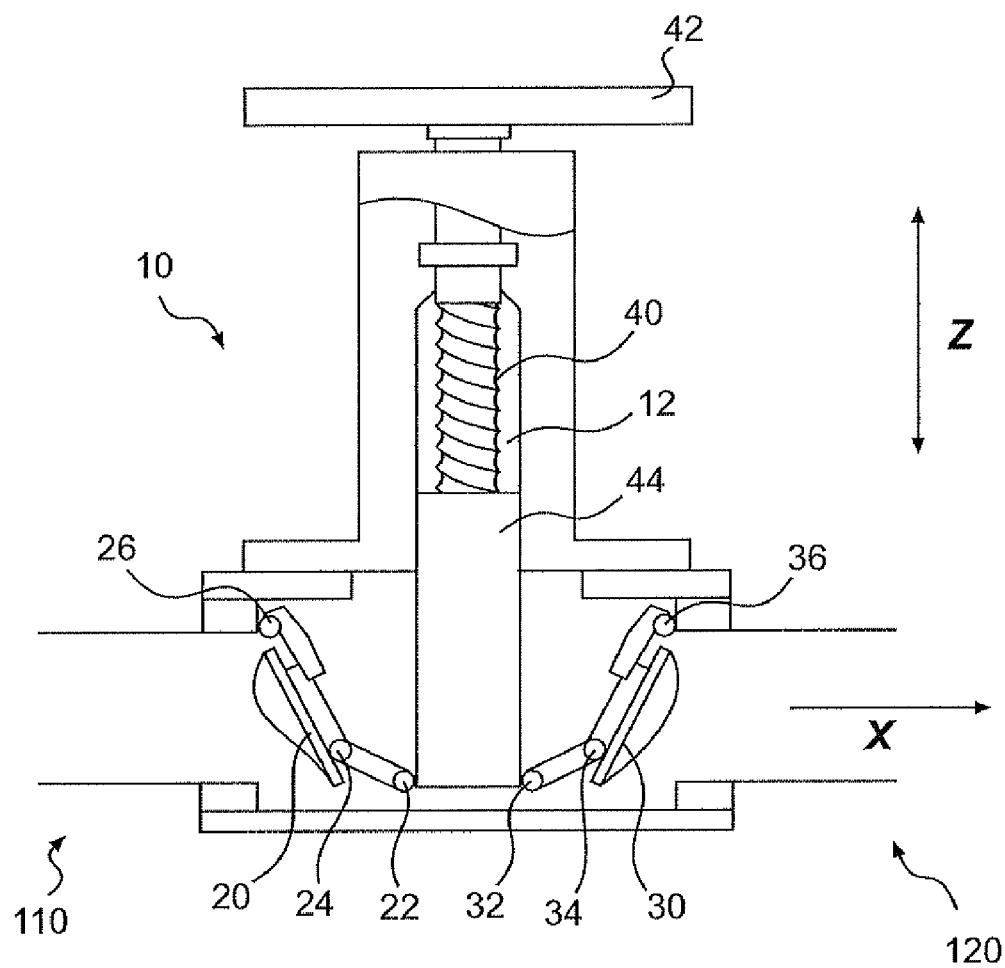
FIG. 1 shows a side view of a partially cross sectioned shut-off fitting in accordance with one of the preferred embodiments of the invention showing two closing bodies in almost closed position.
Figure 3:
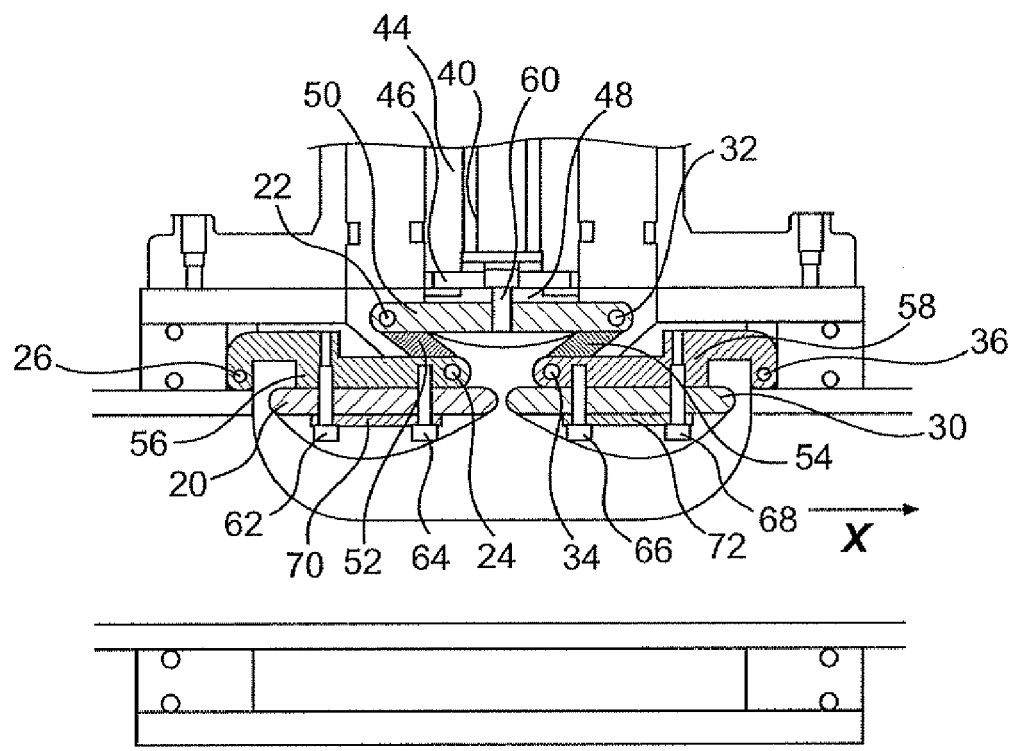
FIG. 3 shows a detailed view of the articulated mechanism.
Figure 4:
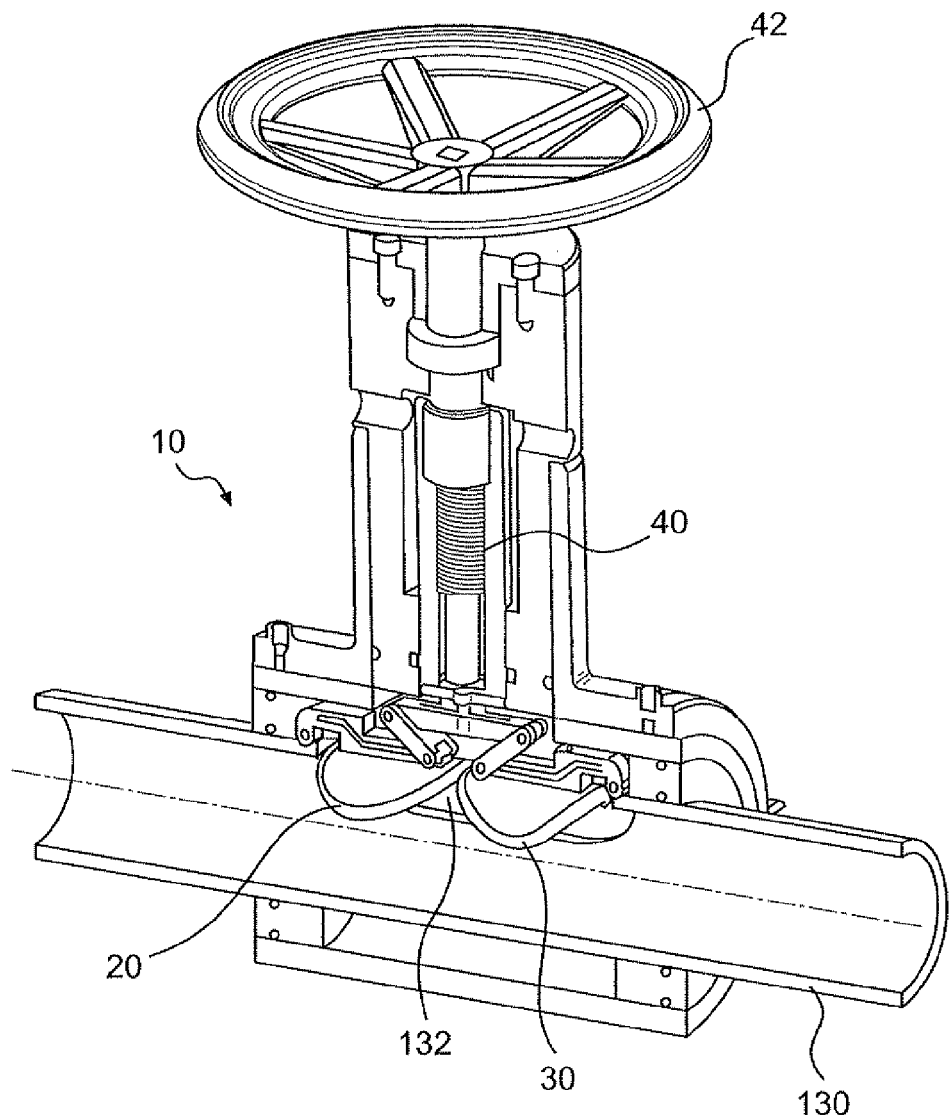
FIG. 4 shows a perspective and partial cross section of the shut-off fitting similar to FIG. 2 with the closing bodies in the open position.
Figure 5:
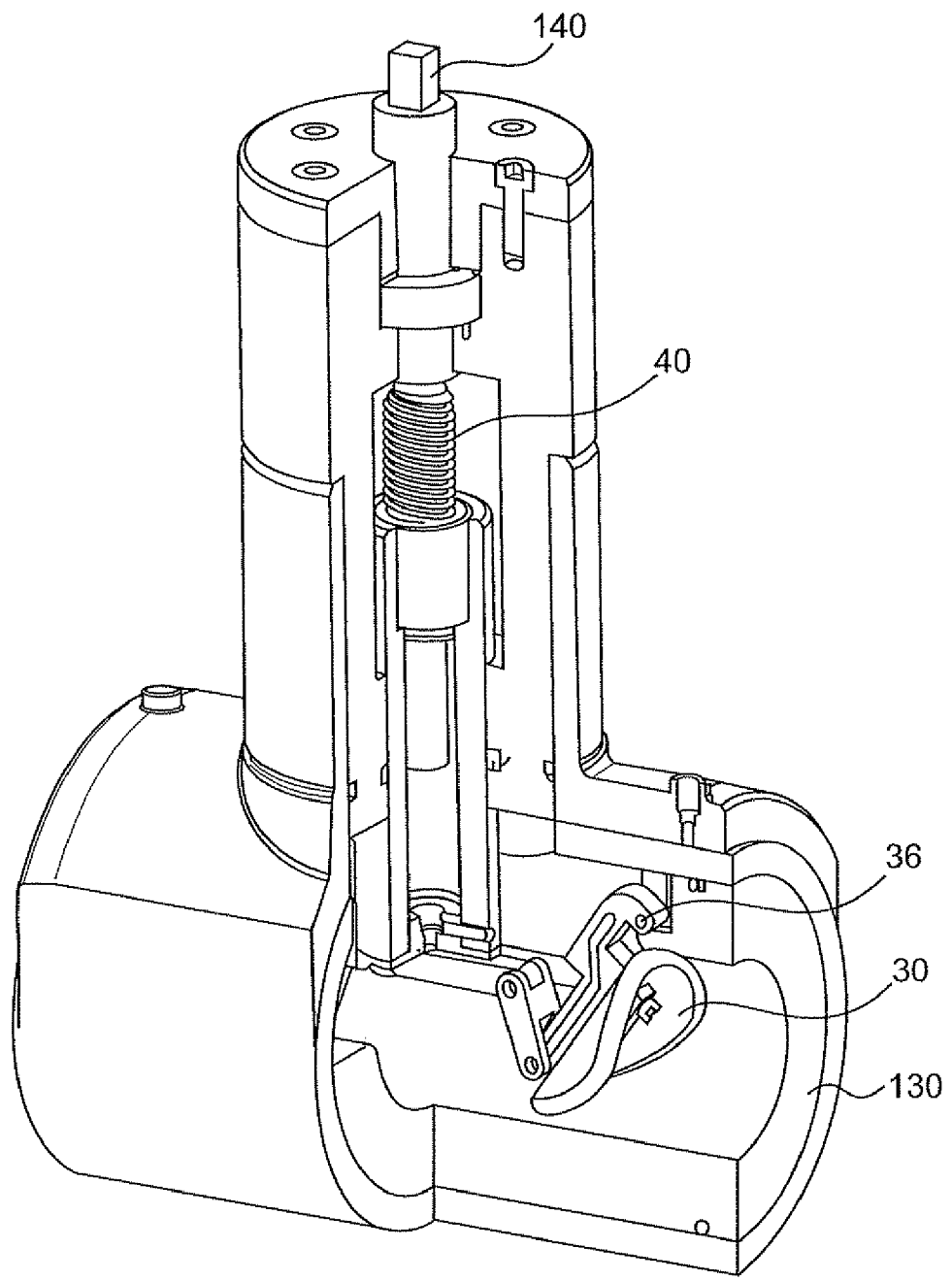
FIG. 5 shows a perspective of a shut-off fitting fitted with the closing bodies in almost closed position.

FIG. 1 shows a schematic view of a partially cross sectioned shut-off fitting comprising a housing (10) which is connected to adjacent pipelines 110, 120 in a pressure tight manner. Basically, the shut-off fitting can also be a sliding fitting as is shown in FIGS. 3, 4 and 5. The seal on the PE pipe is achieved using heater coil welding techniques. On the inside of the housing 10 a tubular passage is also defined by means of the internal diameter of the pipe line 110, 120. Every pipe line 110, 120 can be closed by a closing body 20, 30 which is connected in a movable manner on the one hand to the housing 10 of the shut-off fitting and on the other to the actuator driving mechanism which is movable in the vertical direction of the double arrow z by means of an articulated mechanism that will be described in further detail below. The actuator comprises a non raising screw drive 40 which is mounted in the housing 10 in a movable manner whereby the turning mechanism is schematically shown as a hand rotational wheel 42. The screw drive 40 grips, in the usual manner, a screw drive bushing 44 that can move inside a guide 12 fitted in the housing 10. The screw drive 40 or screw bushing 44 is closed by a lip seal not shown in the figure.

The articulated mechanism for the closing bodies 20, 30 each comprise a lever rod fitted with three axes 22, 24, 26 or 32, 34, 36 which all run laterally to the flow direction x. Axis 22 or as the case may be 32 are actuator mounted, axis 24, or as the case may be, 34 are mounted to the body and axes 26 to 36 are mounted to the housing whereby axes 26 and 36 are fitted on the outside of the pipe diameter of pipes 110 and 120 on the housing 10. Axes 22 and 32 which are mounted to the actuator are fitted onto the distal end of the screw bushing 44.

Figure 2:
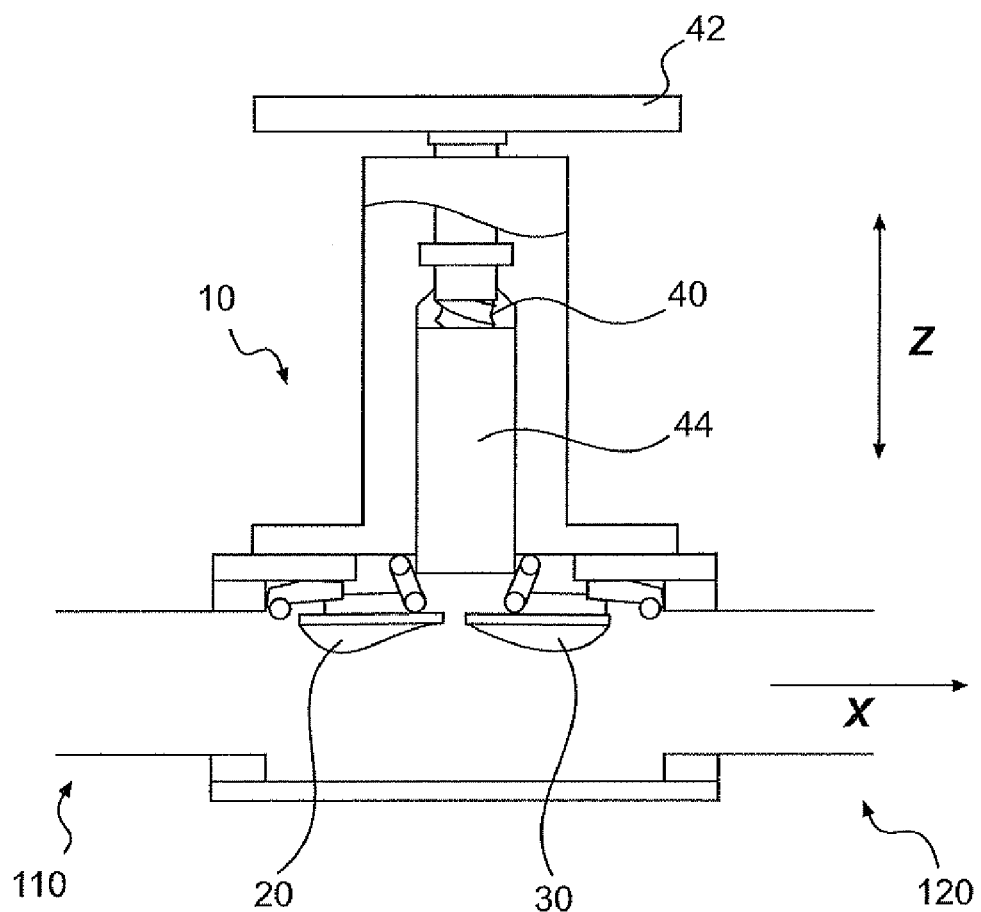
FIG. 2 shows a view similar to the view in FIG. 1, whereby the closing bodies are in the open position.

FIG. 1 shows the shut-off fitting with the pipe line 110, 120 almost closed by the closing bodies 20, 30. In the closed position the closing bodies 20, 30 are tightly joined together in the tubular passage whereby the interior seal is achieved because of the elastic deformation of the plastic the closing body is made of and/or a sealing material which is present on the closing body or bodies 20 and 30 and/or on the interior surface of the tubular passage, for example, in the form of a lip seal. When the pipe line 110, 120 must be opened the rotational wheel 42 is turned so the screw drive 40 is turned into the screw bushing 44. As this happens, the axes 22 and 32 are also moving vertically upwards and lead flaps 20 and 30 into an end position which is shown in FIG. 2. The closing bodies 20 and 30 are in alignment with the tubular passage of the pipe line 110, 120.

FIG. 3 shows details of the articulated mechanism in the open position as the screw drive 40 moves into the screw bushing 44. The floor 46 of the screw bushing 44 is fitted with a screw hole so that a screw 60 can hold a first lever rod 50 securely to the screw bushing 44 with the aid of a well ring 48 or something similar. The first lever rod 50 is higher than the exterior scope of the screw bushing 44 and at its ends defines the axes 22, 32 vertically to the flow direction x. Additional levers 52, 54 are fitted in a displaceable manner around the axes 22, 32. With its other ends this lever forms 52, 54 the connection to the closing bodies 20, 30. For this purpose, a third lever 56, 58 is held in place by two screws 62, 64 or 66, 68 on each of the closing bodies 20, 30 and is secured by a counter piece 70, 72. Each of these levers 56, 58 consist of an elongated section that stretches over the closing body 20, 30 in the flow direction x. On this elongated section lever 52 or 54 is fitted so it can be moved around axis 24 or 34 on the side shown in the center of the drawing. The third lever 56, 58 is fitted with a piece that in the cross section is J-shaped and that reaches from above the elongated section and curves to the housing to which it is fitted so it can move around the axes 26 and 36. The lever length is chosen so that, in the open position, the axes 24 and 34 lie, in relation to the center of the drawing, within axes 22, 32. In this manner, the flaps 20 and 30 are led together so that they almost touch under the screw bushing 44. The flaps 20 and 30 are constructed in such a way that they are in alignment with the contour of the tubular passage. In this way, a low stream resistance profile is achieved.

FIG. 4 shows a perspective and partial cross section of the shut-off fitting as it sits on the pipe line 130 as a sliding fitting. With the aid of the hand wheel 42 the screw drive 40 is operated which, as described above, moves the closing bodies 20, 30. The closing bodies 20, 30 are in the open position and close an opening 132 in the pipe line 130 that functions as a passage way for the articulated mechanism of the actuator. The operation of the actuator is facilitated in the usual manner using a hand wheel 42.

In the perspective view in FIG. 5 the hand wheel has been left out to show the usual manner in which it is attached on a square 140 that is attached in a non-displaceable manner to the screw drive 40 or its extension. The screw drive 40 operates in such a way that its outer contour lies closely to the tubular passage of the pipe line 130 and the closing body 30 moves around the axis 36 that is fitted to the housing. The shape or contour of the closing body 30 is easily seen and is designed to be aligned with the inner surface of the pipe line 130 in the open position. Additional embodiments of the closing bodies that are within the scope the present invention.

In one embodiment, a horizontal shutter with slats may be used. Each of the slats can be received in an opening of the shut-off fitting housing. In the closed position the slats hang so they close a tubular passage. A vertical shutter could be used instead of a horizontal shutter. In another embodiment, a threaded bolt is may be used as the closing body which can be retracted in a closely sealed threaded hole by means of a suitable driving mechanism and thereby close the tubular passage. In another embodiment, a closing body may be designed as an iris diaphragm 400 whereby each of several diaphragm elements is pulled outwards into a corresponding hole in the shut-off fitting housing. In another embodiment, a closing body may be configured to move into the tubular passage and comprises a curved contour that is received by a correspondingly shaped guide. This guide can be made of one piece on the shut-off fitting housing.

Figure 6:
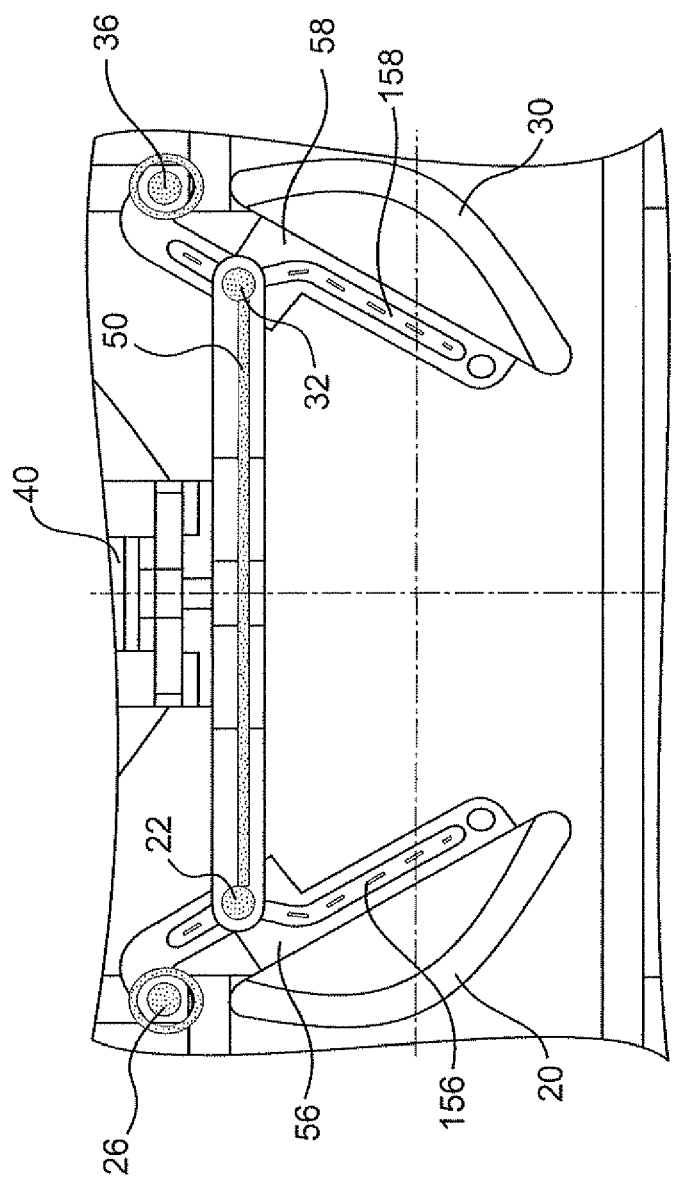
FIG. 6 shows a cross section of an articulated mechanism for a shut-off fitting in accordance with an additional embodiment of the invention.

FIG. 6 shows a cross section of an articulated mechanism for a shut-off fitting in accordance with an additional embodiment of the invention in which the movement of the closing bodies 20, 30 no longer only is facilitated by levers as was the case in the embodiment shown in FIGS. 1 to 5. Instead, the axes 22, 32 that are mounted to the actuator are moved in guiding slots 156, 158 which are fitted in displaceable levers 56, 58 that move around the housing mounted axes 26, 36. As soon as the screw drive 40 is lowered the lever 50 that is securely fastened to it is also lowered and the closing bodies 20, 30 are moved into closing position following a displacement route that either corresponds to the reversed S-shaped guiding slot 156 or the S-shaped guiding slot 158.

Figure 7:
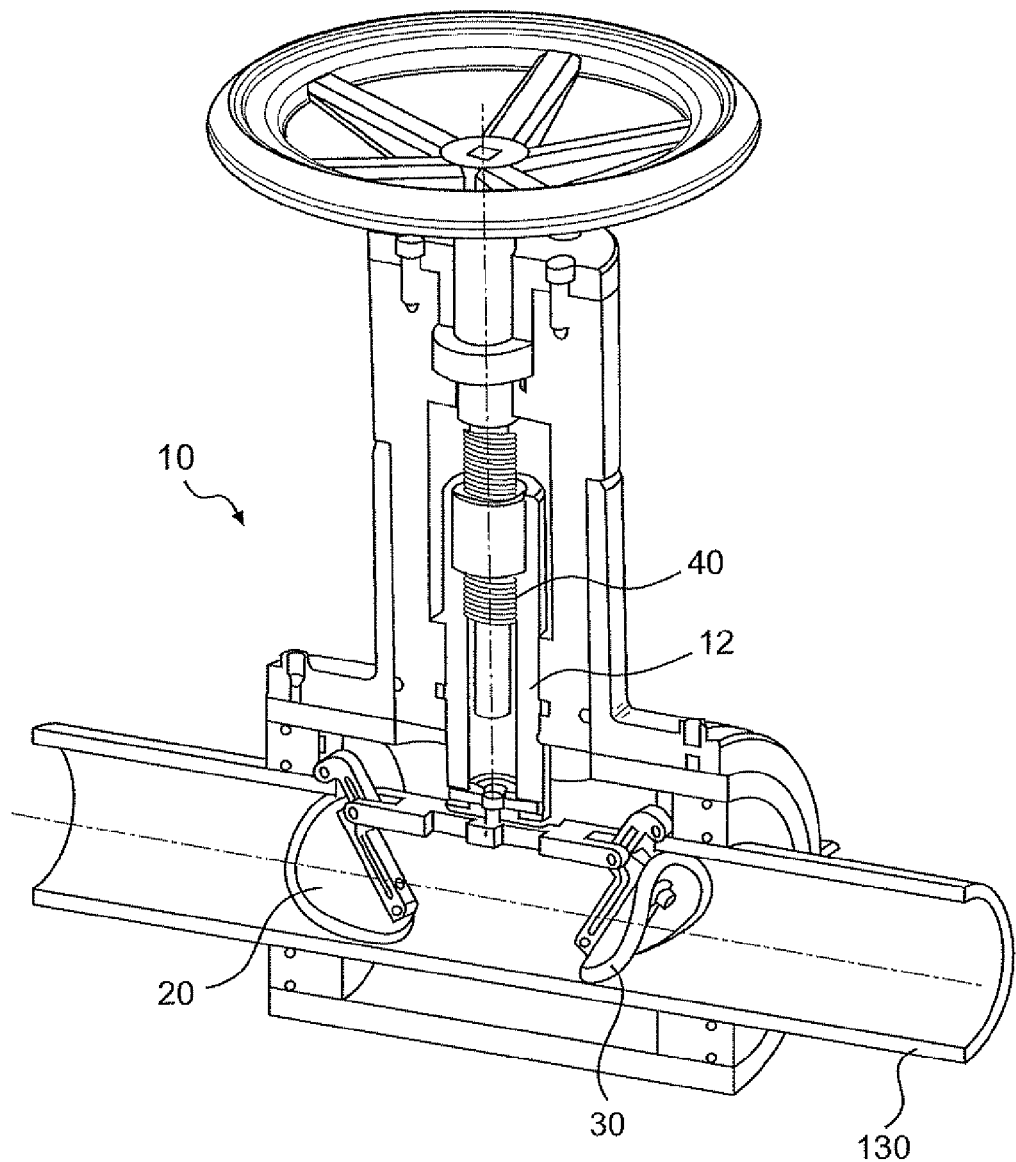
FIG. 7 shows a perspective and partial cross section of a shut-off fitting fitted with the articulated mechanism shown in FIG. 6.

FIG. 7 is a perspective and partial cross section of a shut-off fitting with the articulated mechanism from FIG. 6 that reveals the fact that the rest of the configuration of the shut-off fitting basically corresponds to the configuration from FIG. 4. Particularly noteworthy is the fact that the closing bodies 20, 30 are yet again shaped or contoured so that, in the closing position, they radially seal the tubular passage of the pipe line 130, while in the open position they basically are aligned with the interior surface of the pipe line 130.

Figure 8:
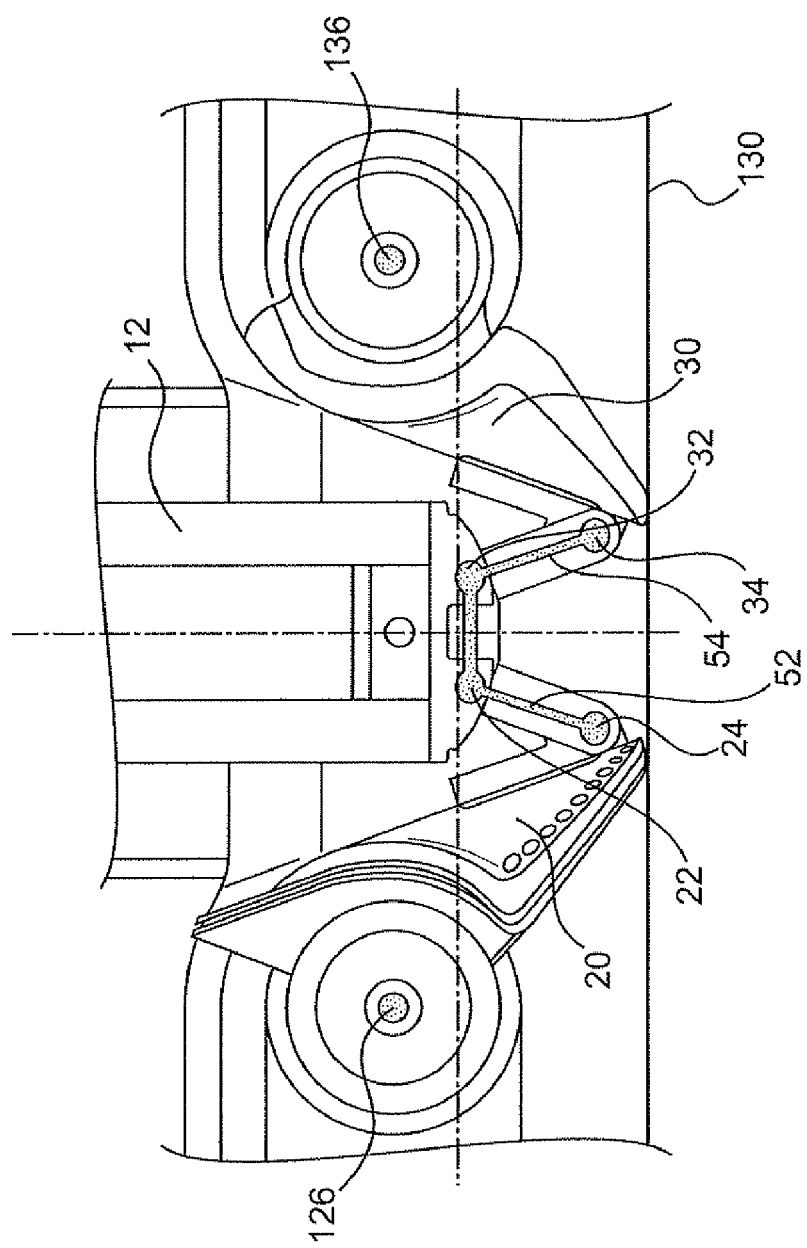
FIG. 8 shows a cross section of an articulated mechanism for a shut-off fitting in accordance with a third embodiment of the invention.

FIG. 8 shows a cross section of an articulated mechanism for a shut-off fitting in accordance with a third embodiment of the invention, whereby the closing bodies 20, 30 are in the closed position. Each of the closing bodies 20, 30 is displaceable around an axis 126, 136 that is integrated into the closing body 20, 30 and is a stationary pivot point on the inside of the pipe. To facilitate the movement of the closing bodies 20, 30 they each have been fitted with a lever 52, 54 on their sides which, in the closed position, are located across from the hinge point 126, 136 on the interior wall of the pipe line 130. The lever 52, 54 is furthermore attached to the sleeve 12 of the actuator around the axes 22, 32 that are mounted on the actuator whereby, as has already been described in previous embodiments, a defined displacement between the closing position and the opening position is possible.

Figure 9:
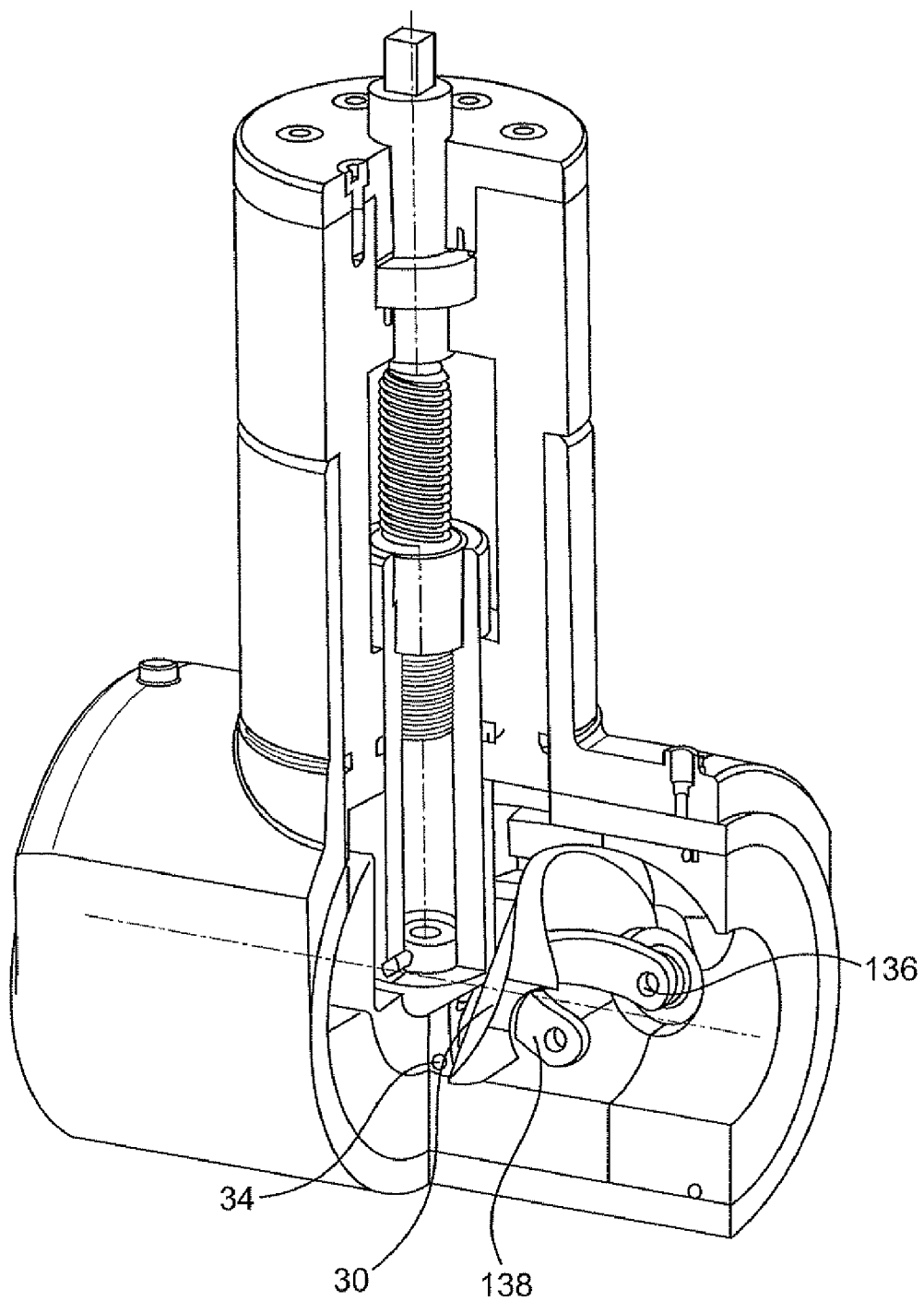
FIG. 9 shows a perspective and partial cross section of a shut-off fitting with the articulated mechanism shown in FIG. 8.

In FIG. 9 it is particularly evident how the integrated placement of the closing bodies occurs. The hinge point 136 could, for example, be a journal that grips openings in a bracket 138 which is tightly connected to the closing body 30. In this embodiment, too, the contour of the closing body 30 (and its counter part which cannot be seen in FIG. 9) is chosen so that, in the open position, the flow resistance is minimized and to allow the passage of a go-devil. The actuator corresponds to those described in the first and second embodiments.

Figure 10:
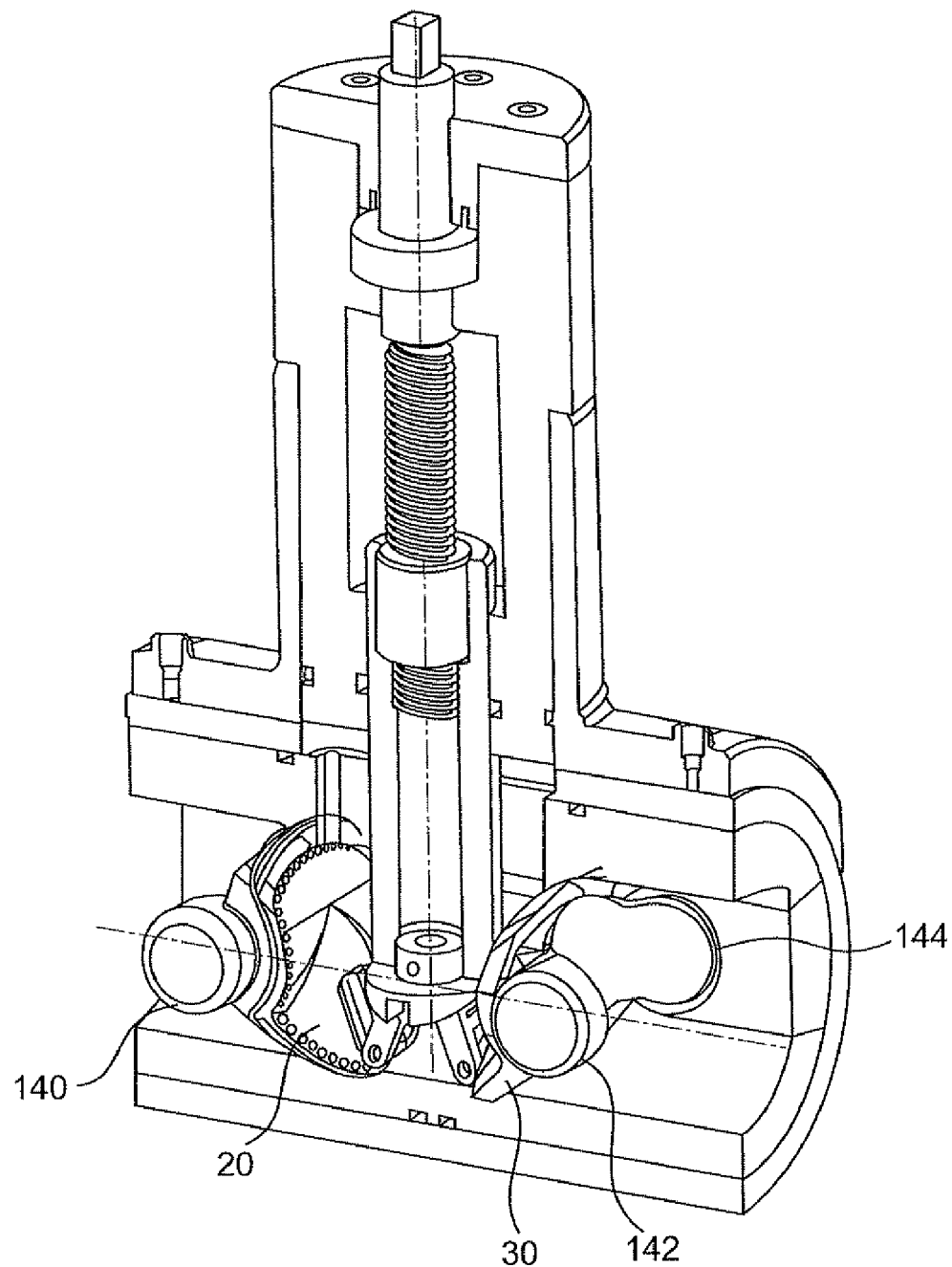
FIG. 10 shows an additional perspective of a shut-off fitting with the articulated mechanism shown in FIG. 8.

In FIG. 10 a further part of the housing 10 has been removed to facilitate a view of the closing body 20. It is easy to see the holding device 140,142, 144 that is integrated into the housing wall and enclosed in a corresponding recess so that the journal itself is neither encrusted nor corroded.

Figure 11:
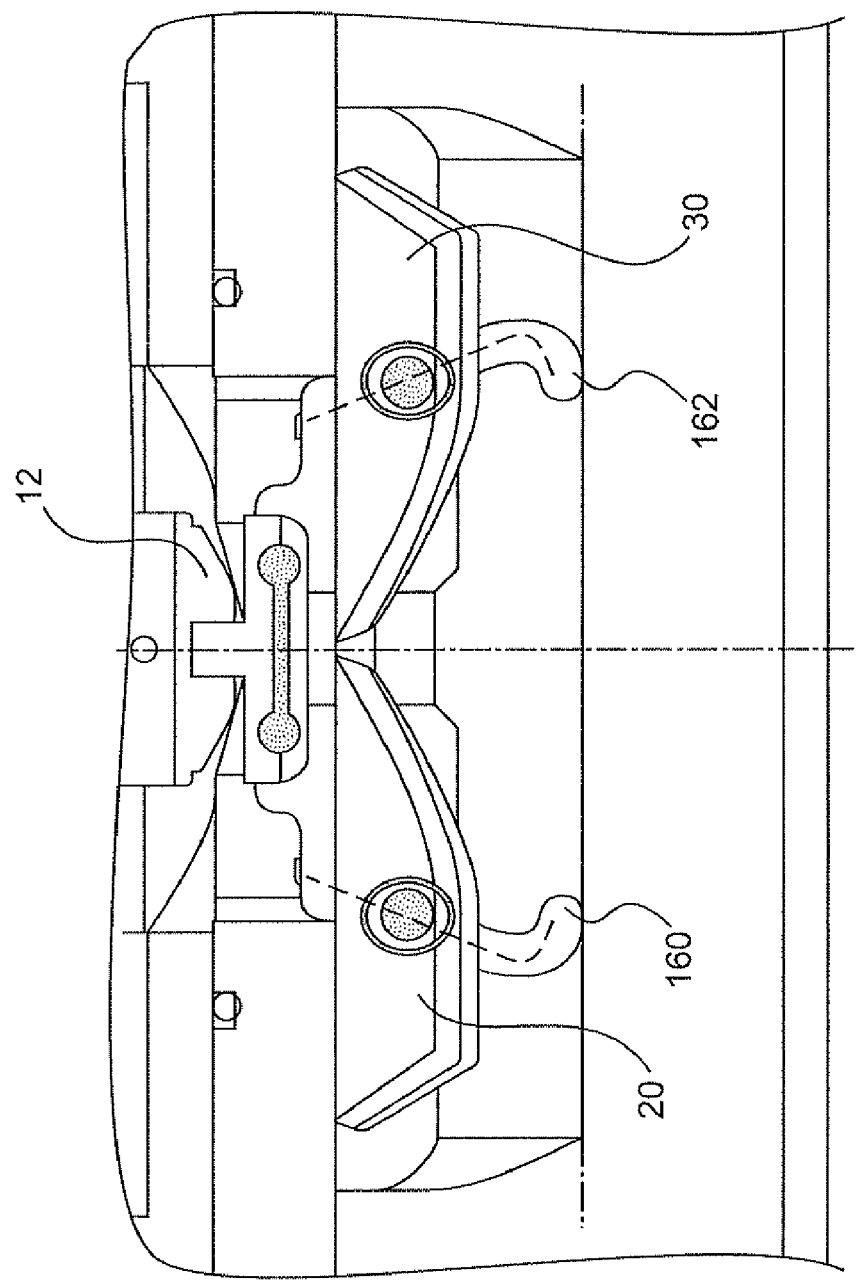
FIG. 11 shows a cross section of an articulated mechanism for a shut-off fitting in accordance with a fourth embodiment of the invention.
Figure 12:
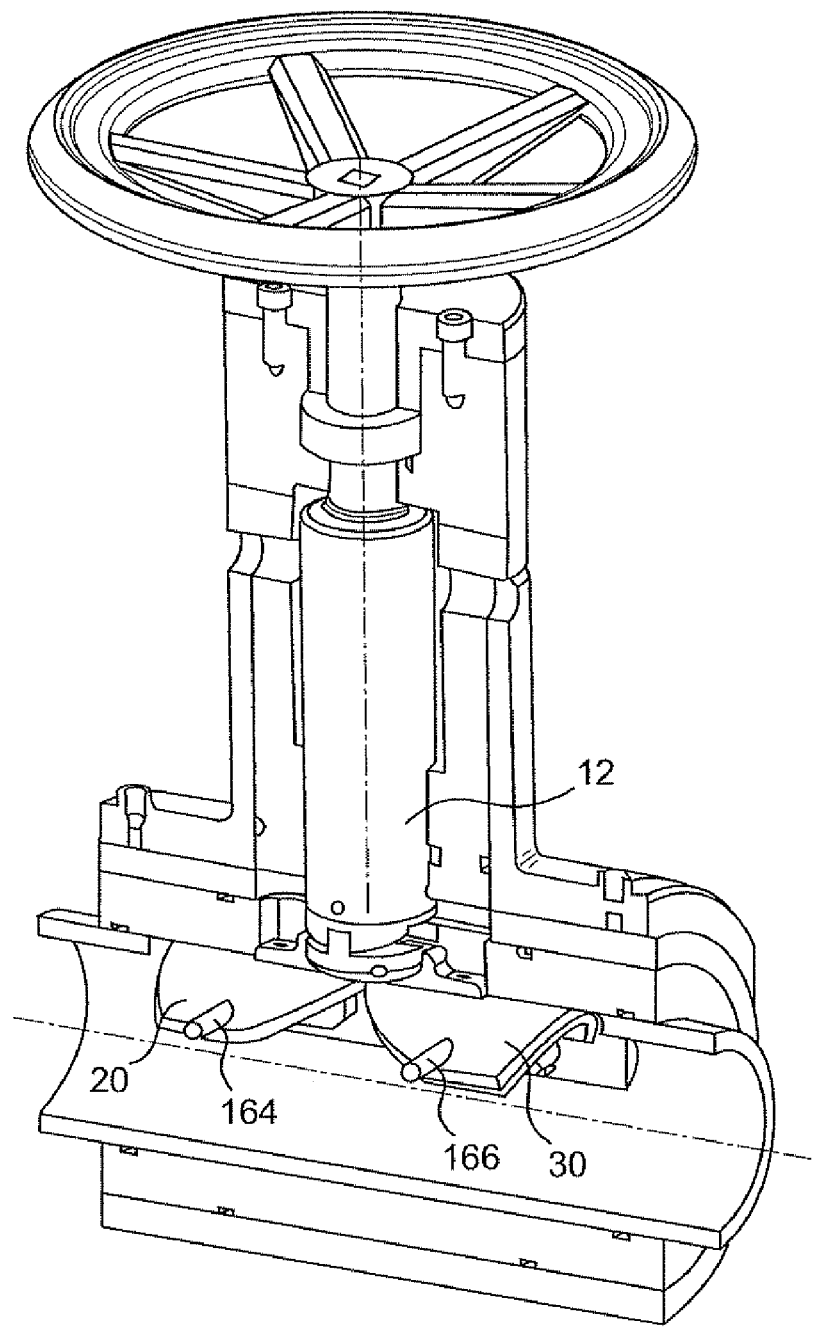
FIG. 12 shows a perspective and partial cross section of a shut-off fitting with the articulated mechanism shown in FIG. 11.
Figure 13:
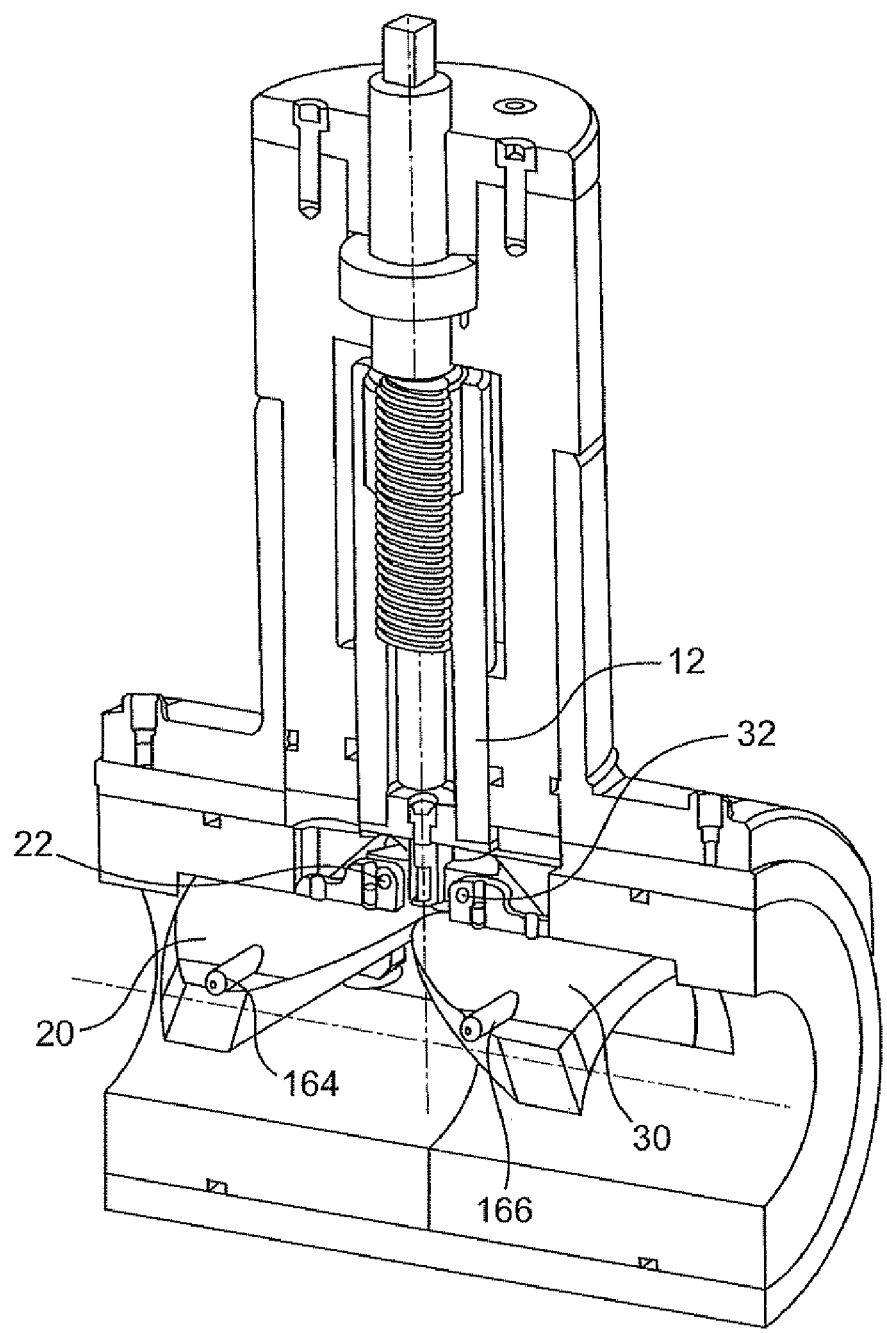
FIG. 13 shows an additional perspective of a shut-off fitting with the articulated mechanism shown in FIG. 11.

FIG. 11 shows a cross section of an articulated mechanism for a shut-off fitting in accordance with a forth embodiment of the invention in which, as shown in FIG. 6, the movement of the closing body 20, 30 from the open position to the closed position or to a defined position in between is facilitated by guiding slots 160, 162 that are L-shaped or J-shaped and located in the housing wall of the shut-off fitting. Correspondingly shaped counter parts are located at a 180 degree angle on the housing so that, as is clearer in FIG. 12, machine pins 164,166 that are tightly connected to the closing bodies 20, 30 can be led into them. All other guidance is facilitated by the hollow shaft 12 of the actuator. A modified design of the closing body 20, 30 is shown in FIG. 13. Here the hollow shaft 12 of the actuator is cross sectioned to show the position of the axes 22, 32 that are mounted to the actuator.

Figure 14:
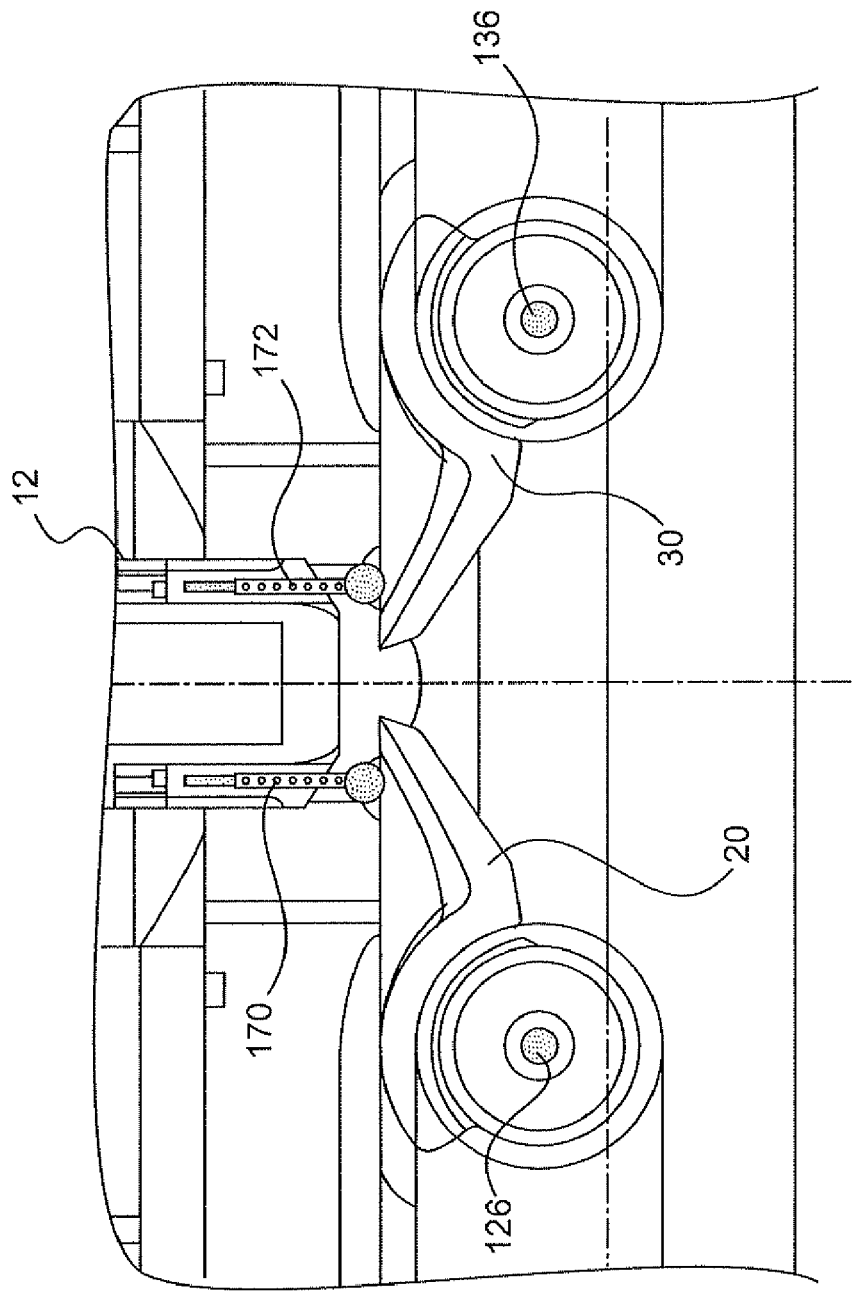
FIG. 14 shows a cross section of an articulated mechanism for a shut-off fitting in accordance with a fifth preferred embodiment of the invention.
Figure 15:
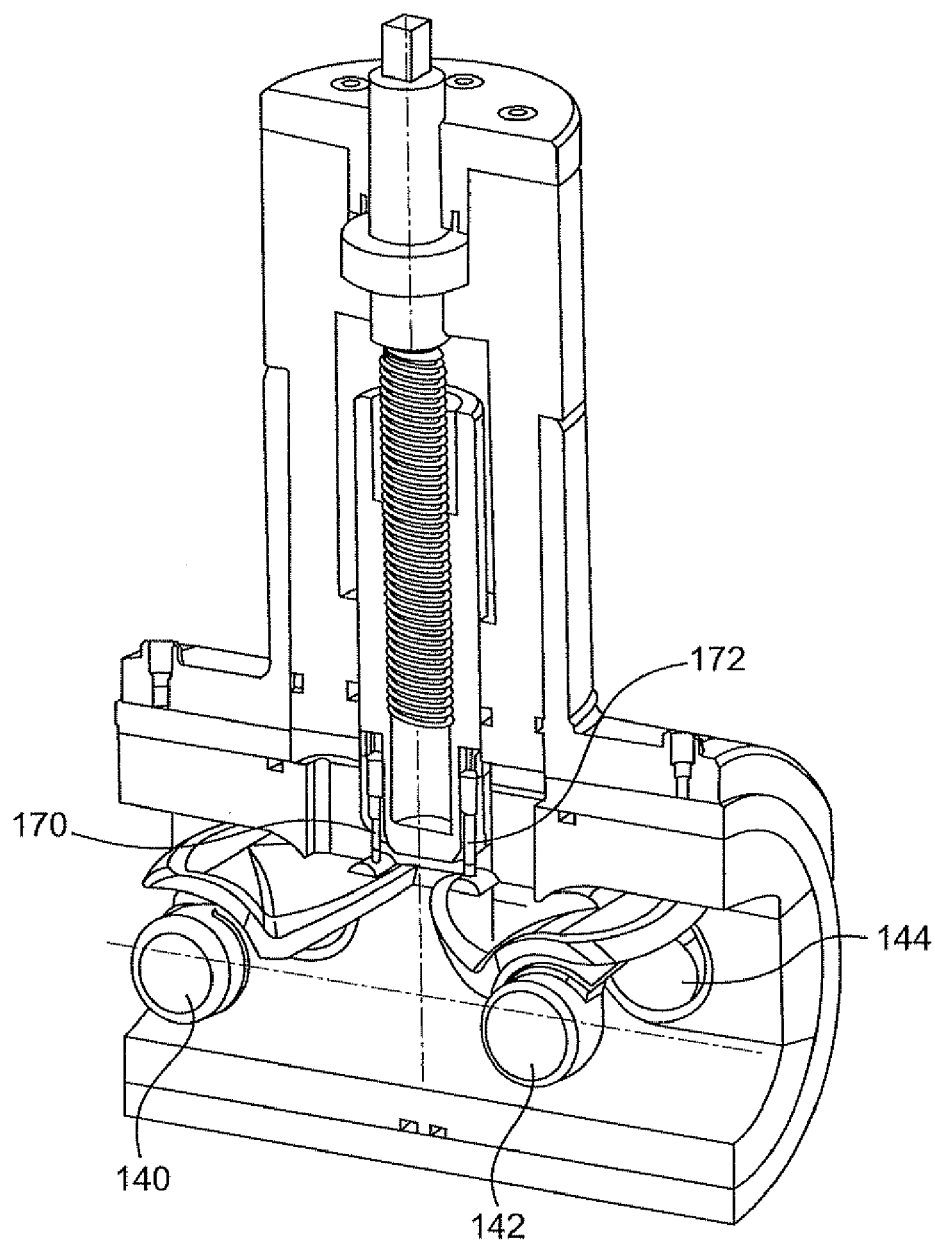
FIG. 15 shows a perspective and partial cross section of a shut-off fitting with the articulated mechanism shown in FIG. 14.
Figure 16:
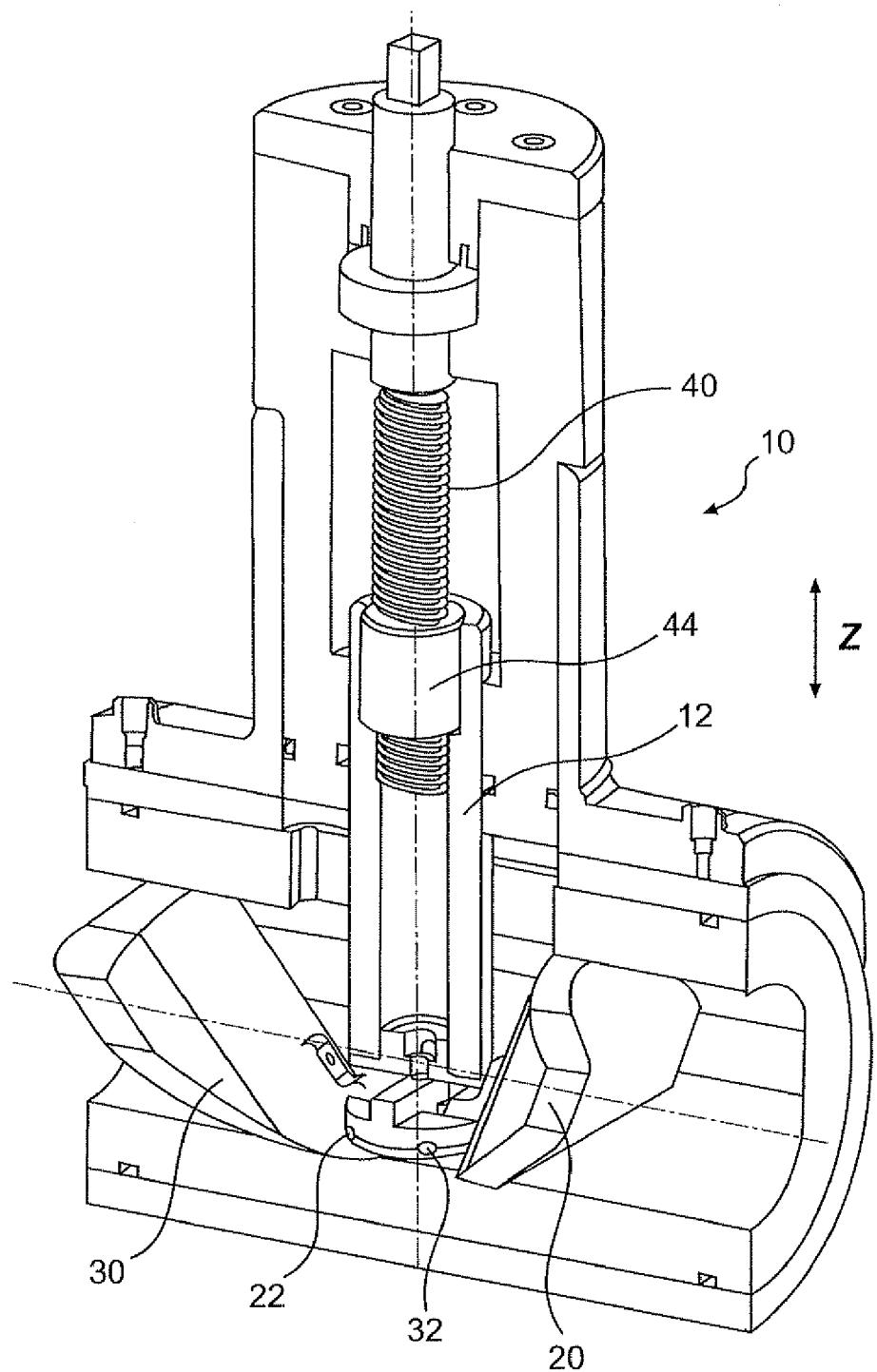
FIG. 16 shows a perspective and partial cross section of a shut-off fitting with an articulated mechanism for a shut-off fitting in accordance with a sixth embodiment of the invention.
Figure 17:
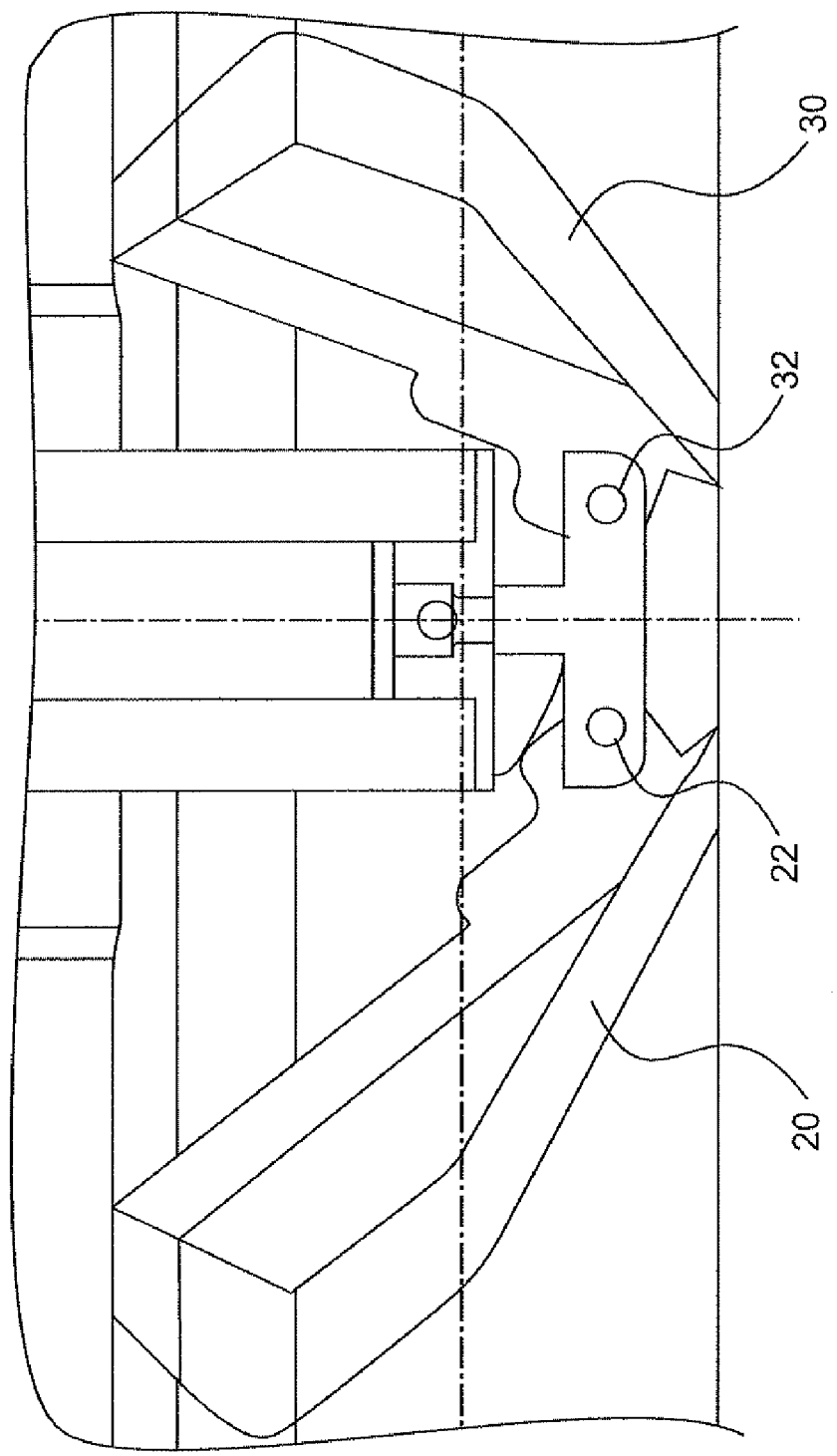
FIG. 17 shows a partial cross section of a shut-off fitting with the articulated mechanism shown in FIG. 16.

FIG. 14 shows a cross section of an articulated mechanism similar to the one shown in FIG. 8 but where the levers 52, 54 (FIG. 8) have been replaced by flexible cable feeders 170, 172 so the need to use axes 22, 32 mounted to the actuator has been eliminated. The arrangement of the hinge points 126 and 136 corresponds to the arrangements shown in FIG. 8, 9,or 10 and will not be repeated here. The mounting of the cable feeders 170, 172 and the arrangement of the integrated holding devices 140, 142, 144 is evident in the perspective view in FIG. 15 which shows a partial cross section of a shut-off fitting The embodiment in FIGS. 16 and 17 shows the closing bodies 20, 30 attached to the axes 22, 32 which are mounted on the actuator so that the closing bodies 20, 30 can pivot around their respective articulation points. Each closing body 20, 30 lie in the pipe and will find its exact position there by the means of form fitting. The closing bodies 20, 30 work with hydraulic forces in the tubular passage which greatly simplifies the kinematic driving mechanism. The relatively free movements of the closing bodies 20, 30 allow them great flexibility when finding their optimal sealing position. Their profile allows them to be self stabilizing in the tubular passage. FIG. 16 shows this in a perspective view.

All embodiments allow the actuator to position the closing bodies in an open or closed position which in turn positions the shut-off fitting but any other defined positioning in between the open and closed position is also facilitated by lowering or raising the screw drive.

The housing material is mainly high density polyethylene (HDPE) to allow for simple attachment to the existing pipe network. Furthermore, the housing can be reinforced with a metallic insert or reinforced thermoplastic material and exterior reinforcement can be achieved using long or short fibers.

The invention specifications described above and in the drawings as well as in the patent claims could be significant both individually and in any chosen combination for the different implementations of the invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

The invention claimed is:

1. A shut-off fitting, comprising:
   a housing connected to an adjacent pipeline in a pressure tight manner, wherein a diameter of the pipeline defines a tubular passage in the housing;

two closing bodies movable between an open position and a closed position, wherein each of the closing bodies has a contour which, in the open position, generates a cleanable smooth pipe floor and which, in the closed position, is located on the tubular passage in a radially sealing manner, and wherein each of the closing bodies has a U-shaped profile;

an articulated mechanism for moving the two closing bodies; and an actuator for moving the articulated mechanism, the actuator being vertically displaced in relation to a flow direction in the tubular passage and being arranged outside the tubular passage in the open position, the actuator having two mounting axes pivotally mounting the two closing bodies, respectively, to an end portion of the actuator, each of the mounting axes being a fixed pivot axis relative to the actuator and to the respectively mounted closing bodies;

wherein each of the closing bodies is mounted solely by one of the two mounting axes.

2. The shut-off fitting of claim 1, wherein the two mounting axes are located within the tubular passage.

3. The shut-off fitting of claim 1, wherein the two closing bodies are configured to self-stabilize into a sealing position by action of hydraulic forces within the tubular passage.

* * * * *